(12) United States Patent
Tamura

(10) Patent No.: US 7,194,816 B2
(45) Date of Patent: Mar. 27, 2007

(54) MOBILE TERMINAL APPARATUS

(75) Inventor: Yasuhiro Tamura, Tokyo (JP)

(73) Assignee: C&N Inc., Tokyo (JP)

( * ) Notice: Subject to any disclaimer, the term of this patent is extended or adjusted under 35 U.S.C. 154(b) by 0 days.

(21) Appl. No.: 11/067,210

(22) Filed: Feb. 28, 2005

(65) Prior Publication Data

US 2006/0010699 A1 Jan. 19, 2006

Related U.S. Application Data (63) Continuation of application No. PCT/JP04/10140, filed on Jul. 15, 2004.

(51) Int. Cl.
*G01C 17/38* (2006.01)
(52) U.S. Cl. .............. 33/355 R; 33/363 R; 33/356
(58) Field of Classification Search ............ 33/355 R, 33/356, 355 D, 1 E, 363 R; 701/220
See application file for complete search history.

(56) References Cited

U.S. PATENT DOCUMENTS

| | | | |
|---|---|---|---|
| 4,539,760 A * | 9/1985 | Marchent et al. .............. 33/356 |
| 5,953,683 A * | 9/1999 | Hansen et al. ................ 702/95 |
| 6,049,761 A * | 4/2000 | Hoshino et al. .............. 702/92 |
| 6,132,391 A * | 10/2000 | Onari et al. ................ 600/595 |
| 6,466,198 B1 * | 10/2002 | Feinstein .................... 345/158 |
| 6,470,264 B2 * | 10/2002 | Bide .......................... 701/207 |
| 6,536,123 B2 * | 3/2003 | Tamura ........................ 33/356 |
| 6,546,336 B1 | 4/2003 | Matsuoka et al. |
| 6,836,971 B1 * | 1/2005 | Wan ............................ 33/356 |
| 2002/0014016 A1 * | 2/2002 | Kato ......................... 33/355 R |
| 2002/0140745 A1 * | 10/2002 | Ellenby et al. ............. 345/848 |
| 2003/0069693 A1 * | 4/2003 | Snapp et al. ................ 701/213 |
| 2004/0066376 A1 * | 4/2004 | Donath et al. .............. 345/169 |
| 2004/0125044 A1 * | 7/2004 | Suzuki ....................... 345/1.1 |
| 2004/0187328 A1 * | 9/2004 | Satoh et al. .................. 33/356 |
| 2004/0236510 A1 * | 11/2004 | Ockerse et al. ........... 33/355 R |
| 2004/0254727 A1 * | 12/2004 | Ockerse et al. ............. 701/224 |
| 2005/0072011 A1 * | 4/2005 | Miyashita et al. ........ 33/355 R |
| 2005/0232388 A1 * | 10/2005 | Tsuji ........................ 377/24.2 |

(Continued)

FOREIGN PATENT DOCUMENTS

JP 07-019876 1/1985

(Continued)

OTHER PUBLICATIONS

English Abstract of JP Application, HEI 07-173811, Publication No. 09-081308, Mar. 28, 1997, Patent Abstracts of Japan, Japanese Patent Office Website.

(Continued)

*Primary Examiner*—Yaritza Guadalupe-McCall (57) ABSTRACT

A mobile terminal apparatus 1 uses an acceleration sensor as a tilt angle sensor 24, and realizes various applications based on this detection result. A processing unit 10 counts the number of steps of a human based on acceleration components of low frequency detected by the tilt angle sensor that detects the acceleration components. At that time, the acceleration component of an axis among three axes which most approximates a gravity axis is mainly used. A viewpoint relative to a three-dimensional object or a three-dimensional space displayed on a display unit 36 is moved. By effectively utilizing the detection result of the tilt angle sensor, it is possible to realize a mobile terminal apparatus 1 featuring greater usefulness.

10 Claims, 5 Drawing Sheets

U.S. PATENT DOCUMENTS

2006/0015287 A1* 1/2006 Vock et al. .................. 702/141
2006/0021238 A1* 2/2006 Sato et al. .................... 33/356

FOREIGN PATENT DOCUMENTS

| | | |
|---|---|---|
| JP | 07-280583 | 10/1995 |
| JP | 08-278137 | 10/1996 |
| JP | 09-081308 | 3/1997 |
| JP | 09-096679 | 4/1997 |
| JP | 09-321639 | 12/1997 |
| JP | 2001-289646 | 10/2001 |
| JP | 2003-042766 | 2/2003 |
| TW | 503324 | 9/2002 |
| TW | 594553 | 6/2004 |

OTHER PUBLICATIONS

English Abstract of JP Application, HEI 06-099360, Publication No. 07-280583, Oct. 27, 1995, Patent Abstracts of Japan, Japanese Patent Office Website.

English Abstract of JP Application, HEI 05-183317, Publication No. 07-019876, Jan. 20, 1995, Patent Abstracts of Japan, Japanese Patent Office Website.

English Abstract of JP Application, HEI 2001-229966, Publication No. 203-042766, Feb. 13, 2003, Patent Abstracts of Japan, Japanese Patent Office Website.

English Abstract of JP Application, HEI 07-107125, Publication No. 08-278137, Oct. 22, 1996, Patent Abstracts of Japan, Japanese Patent Office Website.

English Abstract of JP Application, HEI 07-252349, Publication No. 09-096679, Apr. 8, 1997, Patent Abstracts of Japan, Japanese Patent Office Website.

English Abstract of JP Application, HEI 08-139012, Publication No. 09-321639, Dec. 12, 1997, Patent Abstracts of Japan, Japanese Patent Office Website.

Taiwanese Patent Office, Notice of Rejection, Jun. 21, 2006.

English Abstract of JP Application No. 2000-104689, Publication No. 2001-289845, Oct. 19, 2001, Patent Abstracts of Japan, Japanese Patent Office Website (corresponds to TW503324).

* cited by examiner

MOBILE TERMINAL APPARATUS

CROSS REFERENCE TO RELATED APPLICATION

This application is a continuation of PCT/JP04/10140 which was filed on Jul. 15, 2004 by Yasuhiro TANURA and entitled MOBILE TERMINAL APPARATUS.

FIELD

The present invention relates to mobile terminal apparatuses such as a mobile telephone and it particularly relates to a mobile terminal apparatus equipped with a function to determine azimuth.

BACKGROUND

Developing mobile terminal apparatuses equipped with azimuth measuring function has been conducted in recent years. A magnetic sensor is utilized for the measurement of an azimuth. These mobile terminal apparatuses display a present position and the like on a map shown on the screen using an azimuth measured according to positional information from GPS (Global Positioning System).

The magnetic sensor detects not only natural magnetic fields but also dynamic magnetic fields generated by the interior of the mobile terminal apparatus as well as by nearby electrical equipment or the like. Hence, in order to extract natural magnetic field component only, it is necessary to delete the dynamic magnetic components from the detected magnetic components. When a two-axis magnetic sensor is used, the magnetic field strength cannot be determined, so that it is difficult to remove the dynamic magnetic components efficiently.

Consideration is given to the introduction of a three-axis magnetic sensor in order to determine the magnetic field strength. Moreover, to determine an azimuth accurately, it is necessary to correct the terrestrial magnetism vector component detected by the three-axis magnetic sensor with the inclination of the mobile terminal apparatus taken into consideration. The inclination of the mobile terminal apparatus is measured by a tilt angle sensor.

SUMMARY OF THE INVENTION

Under these circumstances, it is preferable that a tilt angle sensor be provided in a mobile terminal apparatus equipped with azimuth measuring function. The inventor of the present invention has developed a variety of applications by focusing his attention on the effective utilization of this tilt angle sensor. The object of the present invention is therefore to provide a variety of possibilities of a mobile terminal apparatus equipped with azimuth measuring function and realize a mobile terminal apparatus featuring greater usefulness.

A mode of the present invention is a mobile terminal apparatus. This apparatus comprises: a magnetic sensor which detects three-axis components of a terrestrial magnetism vector; a tilt angle sensor which detects acceleration components in three-axis directions; a processing unit which determines azimuth by performing coordinate transformation on the terrestrial magnetism components detected by the magnetic sensor, based on a detection result of the tilt angle sensor, wherein the processing unit detects acceleration components of a frequency in a predetermined range, based on a detection result along an axis among the axes of the tilt angle sensor which most approximates a gravity axis, and counts the number of user's steps. According to this mode, the provision of a highly accurate function of a pedometer can result in realizing a mobile terminal apparatus featuring greater usability.

The processing unit may determine user's ambulation trajectory based on the azimuth and the number of steps or may omit a component that has converged within a predetermined period of time, among the detected acceleration components, from the count of the number of steps. By omitting vibrations or shocks other than walking motion from the count of the number of steps, the pedometer is given a function having further raised accuracy.

Another mode of the present invention is also a mobile terminal apparatus. This apparatus comprises: a magnetic sensor which detects three-axis components of a terrestrial magnetism vector; a tilt angle sensor which detects acceleration components in three-axis directions; a display unit which displays an image from a predetermined viewpoint relative to a three-dimensional object or a three-dimensional space; and a processing unit which determines azimuth by performing coordinate transformation on the terrestrial magnetism components detected by the magnetic sensor, based on a detection result of the tilt angle sensor, wherein the processing unit moves the viewpoint relative to the three-dimensional object or the three-dimensional space, based on a detection result of the magnetic sensor and the tilt angle sensor. The processing unit may obtain yaw angle, pitch angle and roll angle based on the detection result of the magnetic sensor and the tilt angle sensor, so as to be corresponded to a three-dimensional shift of the viewpoint. According to this mode, a mobile terminal apparatus can be realized in which the three-dimensional object or the three-dimensional space can be observed from all directions.

Still another mode of the present invention is also a mobile terminal apparatus. This apparatus comprises: a magnetic sensor which detects three-axis components of a terrestrial magnetism vector; a tilt angle sensor which detects acceleration components in three-axis directions; a display unit which displays map; and a processing unit which determines azimuth by performing coordinate transformation on the terrestrial magnetism components detected by the magnetic sensor, based on a detection result of the tilt angle sensor, wherein, based on a detection result of the magnetic sensor and the tilt angle sensor, the processing unit rotates the map in such a manner as to align azimuth of the map with actual azimuth. According to this mode, a display is possible in which the map is related to the actual azimuth.

Still another mode of the present invention is also a mobile terminal apparatus. This apparatus comprises: a magnetic sensor which detects three-axis components of a terrestrial magnetism vector; a tilt angle sensor which detects acceleration components in three-axis directions; an image pickup unit which acquires moving images; and a processing unit which determines azimuth by performing coordinate transformation on the terrestrial magnetism components detected by the magnetic sensor, based on a detection result of the tilt angle sensor, wherein, based on a detection result of the magnetic sensor and the tilt angle sensor, the processing unit corrects camera-shake in the moving images. When the processing unit detects a camera-shake based on the detection result of the magnetic sensor and the tilt angle sensor, correction may be made in such a manner that a feature point of a frame at the detection of camera-shake is aligned to that of a frame preceding the frame. According to this mode, a mobile terminal apparatus equipped with a camera having a function of correcting camera-shake can be realized.

The apparatus in the above-described modes may further comprise a barometric sensor which detects the atmospheric pressure, wherein the processing unit may predict the weather based on a detection result of the barometric pressure. A mobile terminal which can predict the weather can be realized.

It is to be noted that any arbitrary combination of the above-described elements and expressions of the present invention changed among a method, a system, a recording medium, computer program and so forth are also effective as the mode of the present invention.

BRIEF DESCRIPTION OF THE DRAWINGS

FIG. 5 are figures showing how camera-shake is corrected by a processing unit. (a) shows a frame immediately preceding a frame at the detection of camera-shake; (b) shows a frame at the detection of camera-shake; and (c) shows how frames were synthesized.

DETAILED DESCRIPTION

Figure 1:
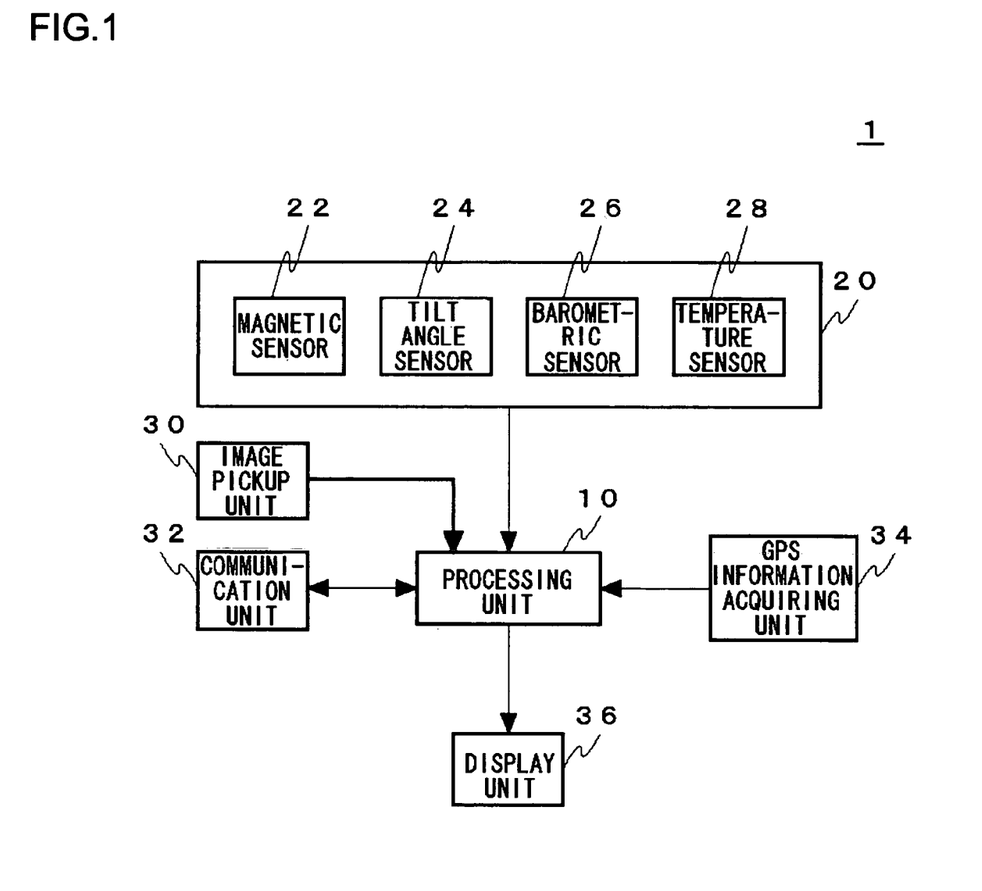
FIG. 1 is a figure showing a structure of a mobile terminal apparatus according to an embodiment of the present invention.

FIG. 1 shows a structure of a mobile terminal apparatus 1 according to an embodiment of the present invention. This mobile terminal apparatus 1 is a portable small electronic device such as cellular phone, PHS (Personal Handyphone System) and PDA (personal data assistant). FIG. 1 shows a structure for realizing azimuth measurement and applications to be described later, but it is understood by those skilled in the art that the mobile terminal apparatus 1 may have other structures according to its uses.

The mobile terminal apparatus 1 is comprised of a processing unit 10, a detecting unit 20, an image-pickup unit 30, a communication unit 32, a GPS information acquiring unit 34 and a display unit 36. The detecting unit 20 has a magnetic sensor 22, a tilt angle sensor 24, a barometric sensor 26 and a temperature sensor 28, and has a function of detecting position, azimuth, bearing, altitude and so forth. The image-pickup unit 30, which is equipped with a photoelectric conversion device, such as a CCD, acquires an image and sends it to the processing unit 10. The communication unit 32 has a function of communicating with an external server via a wireless circuit. This communication may also be carried out via a wire circuit. The GPS information acquiring unit 34 receives positional information from GPS satellites. The processing unit 10 calculates a present position, namely, the latitude and longitude, based on this positional information. It is to be noted that an accurate present position and azimuth can be determined by an arrangement that makes it possible to correct the positional information by azimuthal information from the magnetic sensor 22. The processing unit 10 may be used in such a manner that the positional information and the azimuthal information complement each other. The processing unit 10 can also determine a present position and azimuth based on the detection results only from the detecting unit 20 without making use of the positional information from GPS satellites. The display unit 36, which has a display, outputs information processed at the processing unit 10 according to an application. It is to be noted that a speaker, not shown, may be provided to produce audio outputs of various types of information for the user.

The magnetic sensor 22 detects the three-axis components of terrestrial magnetism vector, and may be any type including flux gate type sensors and those using a Hall element or magnetoresistive element. The X axis, Y axis and Z axis are placed orthogonally to one another. The azimuth angle, or the yaw angle, which is the angle of rotation from magnetic north, is detected based on the X-axis and Y-axis terrestrial magnetism vectors. The terrestrial magnetism vectors, however, are approximately horizontal near the equator, but are inclined in other locations. Also, the posture of the mobile terminal apparatus 1 is not always horizontal. Hence, such terrestrial magnetism vectors have to be corrected, using the pitch angle and roll angle, which are the angles relative to the direction of gravity. The pitch angle and the roll angle are detected by the tilt angle sensor 24. The processing unit 10 corrects the X-axis and Y-axis detection results, using the above-mentioned pitch angle and roll angle, in such a manner that the Z-axis detection results are always equivalent to the condition where they are maintained at the detection results when the Z axis is horizontal. In this manner, even when there is a great change in posture, the accuracy of azimuth angle can be retained by employing a three-axis magnetic sensor and using the Z-axis detection results for correction.

The tilt angle sensor 24, which is an acceleration sensor for detecting acceleration components in three axis directions, comes in the resistance value change type, the capacity change type, the piezoelectric change type and so forth. For the tilt angle sensor 24, too, the X axis and the Y axis are placed orthogonally to each other in a horizontal plane, and the Z axis is placed in the direction of gravity. As the posture of the mobile terminal apparatus 1 inclines, the gravitational acceleration changes, and the pitch angle and the roll angle are detected by detecting this gravitational acceleration. When the mobile terminal apparatus 1 is in the state of being stationary, the posture of the mobile terminal apparatus 1 can be detected accurately using the two axes only. In a case when the user who possesses the mobile terminal apparatus 1 is walking or riding a vehicle such as a car or a bicycle, a kinetic acceleration component will be added to have effect on the tilt angle sensor 24, so that the posture cannot be detected accurately. By the use of three axes, the gravitational acceleration and the kinetic acceleration can be separated from each other, thereby enabling an accurate detection of the posture. The pitch angle and roll angle can be calculated accurately by obtaining an assumed angle by integrating the output values of the respective axes and then performing a predetermined calculation by comparing the assumed angle with the acceleration component.

The barometric sensor 26 detects the atmospheric pressure, and the temperature sensor 28 detects the temperature. The temperature detected is used to correct the deviations of the outputs of the magnetic sensor 22, the tilt angle sensor 24 and the barometric sensor 26 due to temperature drift.

Figure 2:
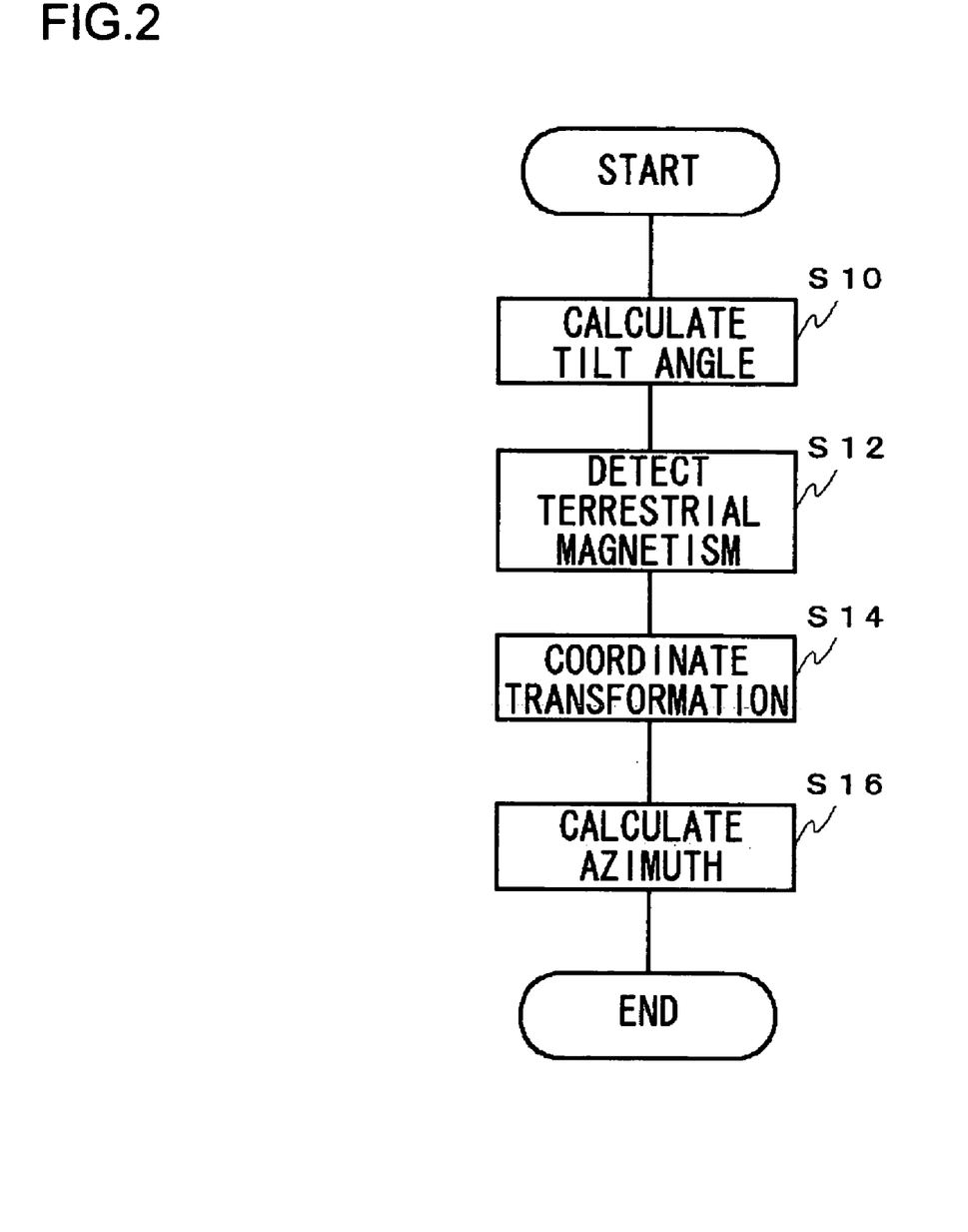
FIG. 2 is a figure showing a flow of calculating an azimuth based on detection results from a magnetic sensor and a tilt angle sensor.

FIG. 2 shows a flow of calculating an azimuth based on detection results from a magnetic sensor 22 and a tilt angle sensor 24. First, the tilt angle of the magnetic sensor 22 is calculated based on the acceleration components in the three-axis directions detected by the tilt angle sensor 24 (S10). Here, the pitch angle and the roll angle are components of the terrestrial magnetism vector (S12). The processing unit 10 performs a coordinate transformation of the components of the terrestrial magnetism vector by the use of the pitch angle and the roll angle (S14) and thereby determines an accurate azimuth (S16). At this time, a temperature compensation may be carried out, using the detection results from the temperature sensor 28. This way, the detection results from the tilt angle sensor 24 are used in the calculation of azimuth; however, the present invention, by further utilizing the detection results effectively, realizes applications as described hereinbelow.

<Application 1>

In Application 1, a mobile terminal apparatus 1 is provided with the function of a pedometer. A tilt angle sensor 24 detects acceleration components in the three-axis directions in accordance with the movement of the mobile terminal apparatus 1. Thus, while a user in possession of a mobile terminal apparatus 1 is walking, the tilt angle sensor 24 detects not only the acceleration components corresponding to the tilt angle of the mobile terminal apparatus 1 but also low-frequency acceleration components in response to the movement of the user.

The processing unit 10 performs a frequency analysis on the detection results from the tilt angle sensor 24 and counts the number of user's steps based on the acceleration counts the number of user's steps based on the acceleration components of a frequency within a predetermined range. This predetermined range is set beforehand in such a manner as to cover the walking speeds of the user. An optimum value may be determined through simulation or actual measurement. Since walking motion is such as to add an acceleration component mainly in the direction of gravity, detection results along an axis within the tilt angle sensor 24 which most approximates the axis of gravity are used. Also, the detection results along an axis which most approximates the axis of gravity may be corrected based on the detection results along the other two axes. A decision on which axis most approximates the axis of gravity can be made such that, in a stationary state, an axis showing the largest gravitational acceleration component is selected and, in a dynamic state, it can be calculated based on changes in the resistance values of the respective axes and the calculated values of the pitch angle and the roll angle.

Moreover, in counting the number of steps, the accuracy thereof can be further raised by making a distinction between the vibration due to walking motion and the other shocks. The vibration due to walking motion, which is a regular motion, does not converge so long as the user is walking. In contrast thereto, simple shocks converge within a predetermined length of time. Accordingly, vibration components beyond this predetermined length of time are counted as walking, and the shocks that converge within the predetermined length of time are not counted as walking. Here, an optimum value for the predetermined length of time can be obtained by simulation and actual measurement of the vibration from walking motion of grownups in general, shocks occurring when the mobile terminal apparatus 1 is dropped, and the like. The processing unit 10 can have the calculated number of steps displayed on the display unit 36. It may also have consumed calories corresponding to the number of steps displayed.

The processing unit 10 can have a present position shown on a map displayed on the display unit 36, based on map data stored on ROM (not shown) and GPS information obtained from a GPS information acquiring unit 34. And the processing unit 10 can have the ambulation trajectory of the user displayed. The processing unit 10 can obtain ambulation trajectories from GPS information, but where the radio waves do not reach, it cannot obtain ambulation trajectories from GPS information. Also, in determining an ambulation trajectory by the use of GPS information, the walking distance from the starting point to the measuring point is calculated; however, an accurate azimuth cannot be calculated unless a certain amount of distance is traveled in a certain length of time. Moreover, an azimuth, which is based on GPS information, is calculated after passing the measuring point, and therefore there is a possibility that it differs from the current value of azimuth.

Thus, the processing unit 10 determines an ambulation trajectory based on the azimuth detected by the magnetic sensor 22 and the number of steps and the stride detected by the tilt angle sensor 24. Since the stride is nearly constant during a walk, the distance walked can be calculated by multiplying the stride by the number of steps. The stride to be used may be a set value or one inputted by the user. Alternatively, a stride obtained by calculating after first acquiring GPS information between two points may be registered.

The processing unit 10 makes a choice for use as appropriate between calculated values based on GPS information and calculated values based on the magnetic sensor 22 and the tilt angle sensor 24. For example, in places where radio waves from GPS satellites cannot be received, control may be made so as to use the calculated values of the latter. Furthermore, both the calculated values may be used to complement each other, for instance, by using their averages or by comparing the two calculated values when there has occurred an abrupt change.

<Application 2>

In Application 2, a three-dimensional object or an image in a three-dimensional space displayed on a display unit 36 can be switched to an image, such as said object, seen from a different viewpoint by changing the orientation or posture of a mobile terminal apparatus 1. When the user changes the orientation or posture of the mobile terminal apparatus 1, a magnetic sensor 22 and a tilt angle sensor 24 detect the changed components thereof. A processing unit 10 calculates the yaw angle, pitch angle and roll angle based on the detection results.

Figure 3:
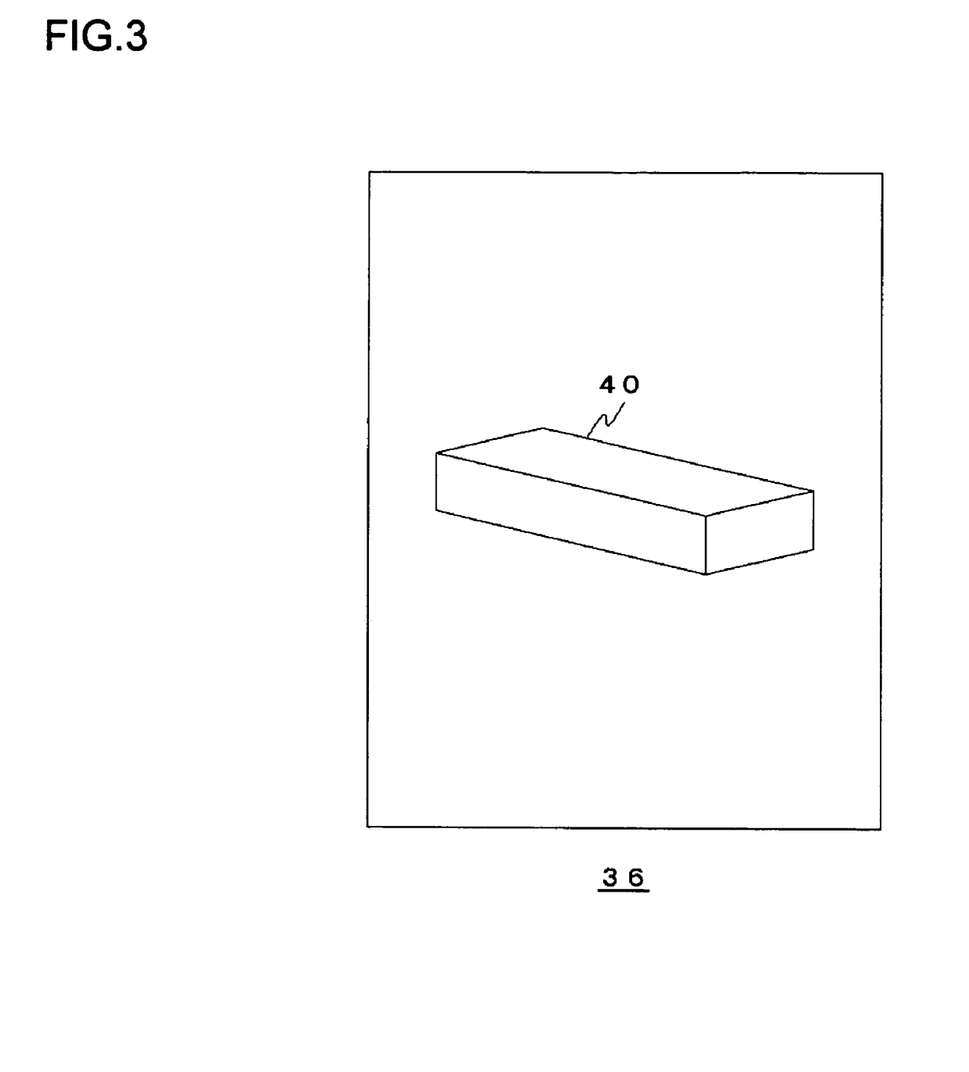
FIG. 3 is a figure showing an example in which a three-dimensional object is displayed on a display unit.

FIG. 3 is a figure showing an example in which a three-dimensional object is displayed on a display unit. The user can observe the three-dimensional object 40 displayed on the screen from all directions. In other words, it suffices if the viewpoint relative to the three-dimensional object 40 can be moved freely in the up-and-down direction, right-and-left direction and depth direction. The processing unit 10 has the shift distances in these three directions correspond to the changes in the yaw angle, pitch angle and roll angle which are calculated based on the detection results from the magnetic sensor 22 and the tilt angle sensor 24. These three correspondence relations and the shift distances of the viewpoint in response to the respective angle changes can be set freely by a designer. Also, it may be so arranged that the user can change these settings arbitrarily. For example, when the change in yaw angle is corresponded to the shift in the depth direction, enlarged or reduced display can be realized as the user rotates the mobile terminal apparatus 1 while maintaining its posture. Moreover, it is possible to move to the back side of the three-dimensional object 40 by shifting the viewpoint. In this manner, the viewpoint can be changed freely without key operation if the user changes the orientation and posture of the mobile terminal apparatus 1.

<Application 3>

Figure 4:
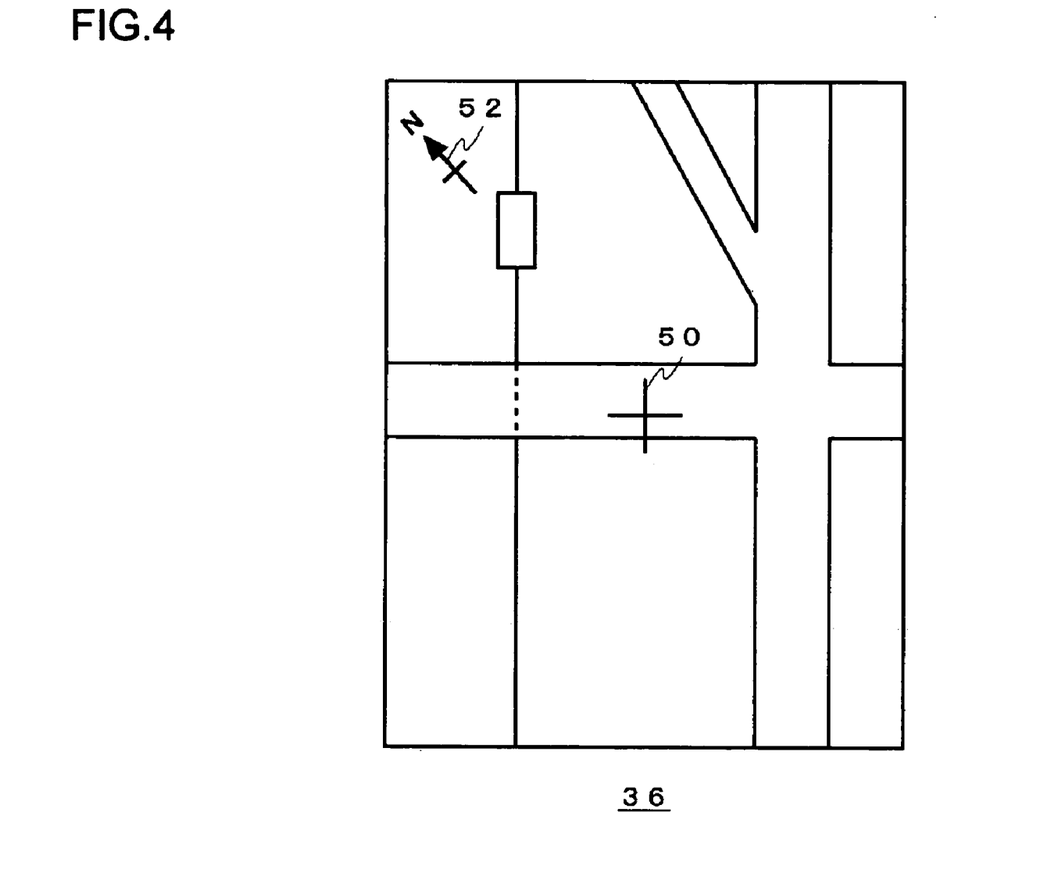
FIG. 4 is a figure showing an example in which a map is displayed on a display unit.

In Application 3, displays are made in a manner such that the azimuth on a map displayed on a display unit 36 is associated with the actual azimuth. FIG. 4 is a figure showing an example in which a map is displayed on the display unit 36. A processing unit 10 causes a map to be displayed on the display unit 36 based on map data stored in ROM (not shown) or the like. At the same time, it calculates the azimuth by correcting the detection results from a magnetic sensor 22 according to the detection results from a tilt angle sensor 24. The map displayed is rotated in such a manner that agreement is reached between the azimuth on the map displayed and the actual azimuth. Hence, the map displayed on the display unit 36 rotates as the user changes the direction he/she is facing.

The processing unit 10 causes the north to be always displayed at the top of the screen without rotating the map itself displayed on the display unit 36, but may have the user recognize the actual north by simultaneously providing a display of an electronic compass 53 or the like. This way, the user can gain useful information by a display made in a manner such the azimuth on the map is associated with the actual azimuth.

In the same way as in Application 2, the viewpoint for the map image displayed on the display unit 36 can be switched by changing the orientation and/or posture of the mobile terminal apparatus 1. As the user changes the orientation and/or posture of the mobile terminal apparatus 1, the magnetic sensor 22 and the tilt angle sensor 24 detect the changing components. The processing unit 10 calculates the yaw angle, pitch angle and roll angle based on the detection results. The designer relates the changes in the pitch angle, roll angle and yaw angle to the shift distances in the up-and-down direction, right-and-left direction and height direction of a viewpoint 50 shown in FIG. 4. For example, when the user moves the mobile terminal apparatus 1 in such a manner as to change the yaw angle, the height from the map plane changes, so that an enlarged or reduced display can be produced. Likewise, when the user moves the mobile terminal apparatus 1 in such a manner as to change the pitch angle and roll angle, the map scrolls up or down or right or left. It is to be noted that, similar to Application 2, the designer can freely set the three correspondence relations and the shift distances of the viewpoint relative to the respective angle changes. Moreover, it may be so arranged that the user can change these settings arbitrarily.

In Applications 2 and 3, the processing may be such that the viewpoint is shifted effectively when the angular velocity of the yaw angle, pitch angle and roll angle is at or above a predetermined threshold value and the viewpoint is not shifted when they are below the threshold value. An optimum value for a predetermined threshold value may be determined through simulation or actual measurement. In this case, when the user changes the orientation and/or posture of the mobile terminal apparatus 1 at a speed below a predetermined speed, the image displayed on the display unit 36 will keep a stationary state, and said image will, for instance, scroll when he/she does it at a speed at or above the predetermined speed.

<Application 4>

In Application 4, correction is made for camera-shake that occurs during the pickup of moving images by an image-pickup unit 30. If the camera-shake is caused by a user during the image taking of moving images by the image-pickup unit 30 of a mobile terminal apparatus 1, a magnetic sensor 22 and a tilt angle sensor 24 detect the changing components due to the camera-shake. The processing unit 10 checks on the changing components and determines whether the changes in the orientation and/or posture of the mobile terminal apparatus 1 are due to the camera-shake or not. For instance, it is possible that the processing is carried out in a manner such that vibrations or the like surpassing a predetermined threshold value are not regarded as camera-shake but slight vibrations below the predetermined threshold value is regarded as camera-shake. Here, an optimum value for the predetermined threshold value may be determined through simulation or actual measurement.

Figure 5A:
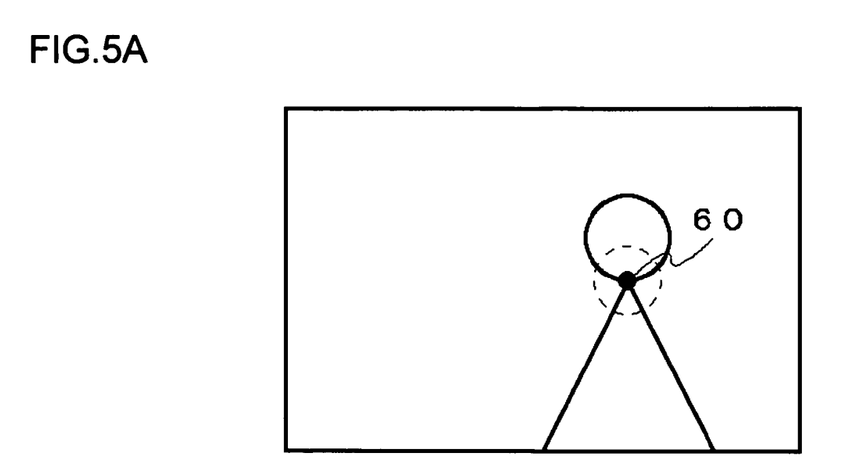
Figure 5B:
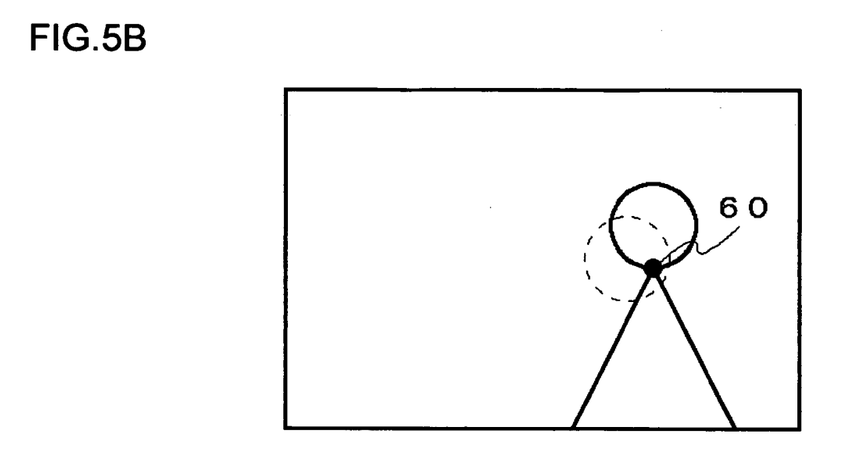
Figure 5C:
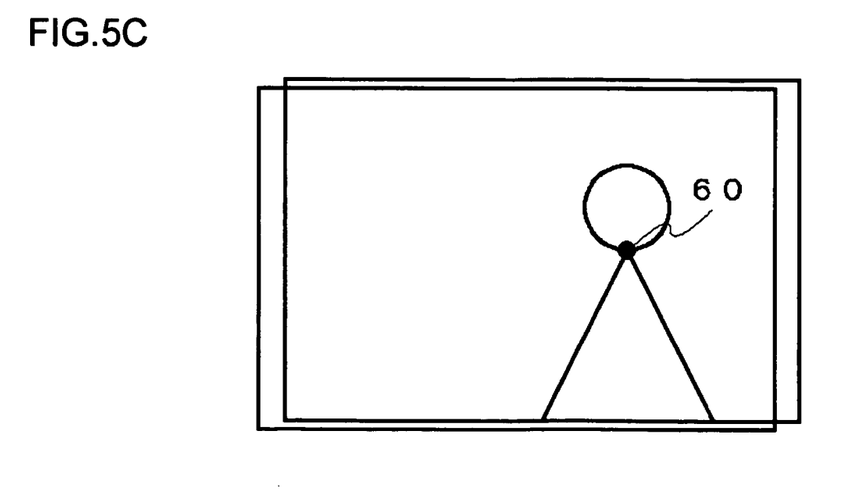

FIGS. 5 are figures showing how camera-shake is corrected by a processing unit 10. (*a*) shows a frame immediately preceding a frame at the detection of camera-shake; (*b*) shows a frame at the detection of camera-shake; and (*c*) shows how frames were synthesized. Upon detecting a camera-shake, the processing unit 10 extracts feature points of a frame immediately preceding the frame at the detection of the camera-shake. Extraction of feature points may be made by utilizing the luminance components of each frame. In FIG. 5(*a*), the neck portion of a person is extracted as a feature point 60. Then, the feature point 60 is searched for in the frame at the detection of camera-shake. Preferably, the search for the feature point 60 is made within a range of about 10 percent up and down and right and left of the pixel position of the feature point 60 in the immediately preceding frame. When extracting the feature point 60 in the frame at the detection of camera-shake, the processing unit 10 synthesizes the two frames by superposing the feature point 60 in the frame at the detection of camera-shake on the feature point 60 in the immediately preceding frame. A state of this is shown in FIG. 5(*c*). In FIG. 6, the feature point 60 in the frame at the detection of camera-shake is off to the right, and therefore the synthesis of the two frames results in a creation of a surplus portion at the left end of the frame at the detection of camera-shake. The processing unit 10 cuts off the surplus portion outside the synthesized range and then takes this as a frame at the detection of camera-shake.

In this manner, the camera-shake that occurs during an image-pickup by a mobile terminal apparatus 1, such as a mobile phone with a built-in camera, can be easily corrected by image processing effected by an application without the use of any complex mechanism. In doing so, the correction may be made only when the occurrence of camera-shake is recognized in the light of the detection results from a magnetic sensor 22 and a tilt angle sensor 24, so that the increase in the amount of computation can also be suppressed to the minimum.

<Application 5>

In Application 5, the atmospheric pressure, altitude and weather are measured and displayed by the use of a barometric sensor 26. The altitude is calculated using the relationship of "the higher the altitude, the lower the atmospheric pressure". Since the measured value of atmospheric pressure varies with the weather, it is preferable that the relationship between the pressures at the earth's surface, namely, the absolute atmospheric pressures, and the rises thereof at higher positions above the earth's surface, namely, the relative atmospheric pressures, be recorded in advance as a table in ROM (not shown) or the like. It is to be noted that the relationship between the absolute atmospheric pressures and the relative atmospheric pressures may also be stored in a recording portion in the form of a computing equation. The processing unit 10 specifies the altitude by calculating the absolute atmospheric pressure and the relative atmospheric pressure based on the output value of the barometric sensor 26.

The processing unit 10 measures changes in atmospheric pressure by obtaining measurement data from the barometric sensor 26 at predetermined time intervals. From these changes in atmospheric pressure, it is possible to predict the weather ahead as it is improving if the atmospheric pressure is rising, or as it is deteriorating if the atmospheric pressure is dropping.

The present invention has been described based on embodiments. The embodiments are only exemplary and it is understood by those skilled in the art that there may exist various modifications to the combination of such each component and process and that such modifications are within the scope of the present invention.

Various sorts of applications can be developed by using the yaw angle, pitch angle and roll angle obtained from the detection results of a magnetic sensor 22 and a tilt angle sensor 24. For example, an electronic compass 36 that simply indicates the azimuth may be displayed on a display unit 36 by utilizing the yaw angle. As another example, a change in the yaw angle, pitch angel and roll angle or their angular velocities may be associated to various types of operating instructions such as power on/off and fluctuations in sound volume.

INDUSTRIAL USABILITY

The present invention can be applied to, for example, a field relating to mobile terminal apparatuses equipped with various types of sensors.

What is claimed is:

1. A mobile terminal apparatus, comprising:
    a magnetic sensor which detects three-axis components of a terrestrial magnetism vector;
    a tilt angle sensor which detects acceleration components in three-axis directions;
    a processing unit which is connected to the magnetic sensor and the tilt angle sensor, and which determines azimuth by performing coordinate transformation on the terrestrial magnetism components detected by said magnetic sensor, based on a detection result of said tilt angle sensor,
    wherein said processing unit detects acceleration components of a frequency in a predetermined range, based on a detection result along an axis among the axes of said tilt angle sensor which most approximates a gravity axis, said processing unit further determines detected acceleration components that do not converge within a predetermined period of time as vibrations due to walking motion and counts a number of user's steps based on said determining.

2. A mobile terminal apparatus according to claim 1, wherein said processing unit determines user's ambulation trajectory based on the azimuth and the number of steps.

3. A mobile terminal apparatus according to claim 2, further comprising a barometric sensor which detects the atmospheric pressure, wherein said processing unit predicts weather based on a detection result of said barometric pressure.

4. A mobile terminal apparatus according to claim 1, wherein said processing unit further counts an acceleration component that has converged within a predetermined period of time as a shock.

5. A mobile terminal apparatus according to claim 4, further comprising a barometric sensor which detects the atmospheric pressure, wherein said processing unit predicts weather based on a detection result of said barometric pressure.

6. A mobile terminal apparatus according to claim 1, further comprising a barometric sensor which detects the atmospheric pressure, wherein said processing unit predicts weather based on a detection result of said barometric pressure.

7. A mobile terminal apparatus, comprising:
    a magnetic sensor which detects three-axis components of a terrestrial magnetism vector;
    a tilt angle sensor which detects acceleration components in three-axis directions;
    a display unit which displays an image from a predetermined viewpoint relative to a three-dimensional object or a three-dimensional space; and
    a processing unit which is connected to the magnetic sensor, the tilt angle sensor and the display unit, and which determines azimuth by performing coordinate transformation on the terrestrial magnetism components detected by said magnetic sensor, based on a detection result of said tilt angle sensor,
    wherein said processing unit causes the display unit to display the image, detects at least one of an orientation and a posture of the mobile terminal apparatus as a change in a yaw angle, a pitch angle and a roll angle based on a detection result of said magnetic sensor and said tilt angle sensor, and, based on the detected change, moves the viewpoint relative to the three-dimensional object or the three-dimensional space in the vertical direction, horizontal direction and depth direction, such that a user may observe the three-dimensional object or the three-dimensional space from any direction and distance.

8. A Mobile terminal apparatus according to claim 7, further comprising a barometric sensor which detects the atmospheric pressure, wherein said processing unit predicts weather based on a detection result of said barometric pressure.

9. A mobile terminal apparatus, comprising:
    a magnetic sensor which detects three-axis components of a terrestrial magnetism vector;
    a tilt angle sensor which detects acceleration components in three-axis directions;
    an image pickup unit which acquires moving images; and
    a processing unit which is connected to the magnetic sensor, the tilt angle sensor and the image pickup unit, and which determines azimuth by performing coordinate transformation on the terrestrial magnetism components detected by said magnetic sensor, based on a detection result of said tilt angle sensor,
    wherein, based on a detection result of said magnetic sensor and said tilt angle sensor, said processing unit detects camera-shake in the moving images picked up by the image pickup unit during aquisition of moving images, and then corrects a frame at the detection of camera-shake such that a feature point of the frame at the detection of camera-shake is aligned to that of a frame preceding the frame at the detection of camera-shake.

10. A mobile terminal apparatus according to claim 9, further comprising a barometric sensor which detects the atmospheric pressure, wherein said processing unit predicts weather based on a detection result of said barometric pressure.

* * * * *